Patented Apr. 10, 1945

2,373,410

UNITED STATES PATENT OFFICE 2,373,410

ART OF BATING SKINS AND HIDES

Julius Pfannmuller, North Plainfield, N. J., and Arthur L. Schade and Hans Schleich, New Dorp, Staten Island, N. Y., assignors to Wallerstein Company, Inc., New York, N. Y., a corporation of New York No Drawing. Application July 30, 1941,
Serial No. 404,620

3 Claims. (Cl. 195—6)

This invention relates to the art of bating skins and hides.

In the production of leather, one of the intermediate steps between dehairing and tanning is known as bating or puering. Its general purpose is to reduce the swollen condition of the skins or hides, resulting from previous alkaline treatment, and to render the skins or hides soft and flaccid. While the term "puering" has been used in the past largely in connection with treatment by dog or bird dung, and the term "bating" in connection with so-called artificial bates, the term "bating" may be, and is here, used to cover the treatment in a comprehensive sense.

One of the earliest known bates was an infusion of dog, pigeon or other manure. Such treatment, however, involves various objections and disadvantages. For example, the process is attended with more or less violent fermentation which is difficult, if not impossible, to control. As a result of this uncontrolled fermentation, there is always danger that the skins and hides will be spoiled or seriously damaged. Further, the inherent character of these materials makes working conditions unsanitary and generally objectionable.

To avoid these various disadvantages, the art has turned, to a greater or less extent, to so-called artificial bates based on enzymatic rather than bacterial action for the bating operation. For this purpose, pancreatic, bacterial and fungal enzymes have been used. Such bates make possible a much better control over the bating process and largely eliminate the danger of damage to the hides or skins.

It has been found, however, that for certain kinds of hides and skins, and more particularly goat skins, these artificial bates have not given as satisfactory results in all respects as might be desired. In consequence, many tanneries still rely on the old type of bacterial action for their bating operations, either using animal or bird dung or operating with enzymatic bates under conditions which assure active fermentation. Attempts have been made to cultivate the useful bacteria of dog and bird excrements so as to produce pure cultures from the metabolic products of which bates might be prepared. That such attempts have not been successful and that such bates are of limited value at best, is evidenced by the continued reliance in many tanneries on active bacterial fermentation.

It is an object of the present invention to provide a method of bating skins and hides that attains the advantages and beneficial results of bating by bacterial action, at the same time avoiding the danger of damage to hides or skins and the other disadvantages of previously known methods.

It is a further object of the invention to provide a new and improved bating material.

Other objects and advantages of the invention will be apparent from the ensuing description.

In preparing a bate in accordance with the present invention, we employ the metabolic products of pure cultures of anaerobic spore-forming bacteria. These metabolic products are characterized by the presence therein of a proteinase which differs, in type, from that found in pancreas, stomach linings, etc., as well as from those produced by molds and aerobic spore-forming bacteria. This difference resides, at least in the main, in the peculiarly powerful action of the proteinase on collagen.

In carrying out the invention according to what is now considered the best advantage, we inoculate a suitable proteinous nutrient medium with a pure bacterial culture of anaerobic spore-forming bacteria.

While various such bacterial sources may be used, we have found that a pure culture of *Clostridium sporogenes* or a spore-forming anaerobe isolated from an infusion of dog dung gives satisfactory results.

While various proteinase nutrient media may be employed, the ultimate medium should preferably contain nitrogen and carbon sources, as well as certain mineral constituents, such as salts of magnesium, potassium, calcium, and phosphorus, in order to foster growth. We have found, for example, that satisfactory results are obtained with a medium comprising limed skin or hide trimmings neutralized to a pH value below 10.5. To such trimmings is added water in an amount ranging from ½ to 4 parts, by weight, to 1 part proteinous matter, and small amounts of salts of the type mentioned.

If the growth-fostering constituents are not found inherently in medium selected, they may be added. Examples of such additions are hereinafter set forth. The proportional amounts of such additions may vary widely, for example, from ten times the amounts hereinafter given down to zero, depending upon the requirements.

The inoculated medium is then kept at a temperature of around 32° C. and during the period of bacterial development we preferably exclude oxygen from the medium, either by working in a non-oxygen atmosphere or in any other suitable manner. Sooner or later a heavy fermentation sets in, accompanied by profuse development of carbon dioxide with traces of hydrogen. This is maintained until the skin or hide trimmings are entirely dissolved and disappear as such. This normally requires from 24 to 96 hours.

In carrying out the invention to what is now considered the best advantage, we add to the resultant cell suspension, after the trimmings have been dissolved, a suitable antiseptic or disinfectant in order to prevent further bacterial development or any substantial deterioration of the products contained in the liquor. For this purpose, and by way of example, phenol, phenol derivatives, toluene, etc., or the disinfectants disclosed in U. S. Patent No. 2,041,732 may be used.

The active liquor so produced may be used directly as a bating material. Or, if desired, such active liquor may be clarified by removal of the cells and spores by filtration or centrifugation and the clear filtrate used as a bate. In using such liquors, either unclarified or clarified, for bating, a suitable amount of the liquor is added to water to form a bating bath and the skins or hides are immersed in such bath until the desired bating action is obtained. Preferably, a disinfectant is added to prevent undesirable or harmful bacterial action. For this purpose, the disinfectants above mentioned may be used. While the amount of water may vary, a skin-to-water ratio of the order of around 1-2 or 1-3 has been found suitable. The amount of bate material may also vary within a considerable range, a proportion of the the order of 2%, based on skin weight, being suitable. A bating temperature of the order of 29-33° C. has been found suitable.

The invention in its entirety also includes the improved bating material in dry form. To this end, either the unclarified liquor or the clear filtrate may be absorbed on a suitable inert carrier such, for example, as bran or woodflour. It is also possible to produce a dry form of the bate by precipitation with suitable salts or organic solvents such, for example, as ammonium or sodium sulphate, acetone or alcohol. Concentration of the enzyme may be increased through evaporation of the active liquor at low temperatures.

In using the dry form of bating material, a bating bath is formed by adding the material to water and bating as described.

In carrying out the invention in its entirety, we control the bating process by estimating and standardizing the proteinase content of the bating material. This can be attained by measuring the collagen-dissolving power of the proteinase on a suitable subtrate. Such a subtrate may be pure collagen or one can be prepared by dehydrating limed, dehaired skin or hide trimmings which have been neutralized to a pH value of about 7.5, by means of acetone or other suitable organic solvents. After dehydration, the collagenous material is reduced to a powder by grinding, care being taken to avoid any substantial development of heat. The powder thus obtained serves as a subtrate for testing the collagen-dissolving power of the proteinase. If the test shows a departure from the desired standard, the bating material may be concentrated by evaporation or diluted by the addition of inert material, as the case may be. This test and standardization may be carried out at any suitable stage, a convenient stage being subsequent to the addition of the disinfectant. It may also be effected in the dry form.

The bating material herein described may, if desired, be used in conjunction with other enzymatic preparations such as those derived from pancreas, molds, or aerobic spore-forming bacteria.

In the production of leather it is customary, after the alkaline beamhouse treatment of skins and hides, to partially neutralize the latter to a pH ranging from slight acidity to about 10. This neutralizing step, may, if desired, be carried out simultaneously with the bating action by adding customarily used neutralizing agents to the bating bath.

Preparing bating materials and bating according to the following more detailed procedures, which are cited by way of example, has been found to give satisfactory results. It is to be understood that the materials prepared in accordance with Examples 1 to 4, inclusive, may be used to bate skins and hides as per the procedures set forth in Examples 5 and 6 or as above described.

*Example 1*

Wash 200 pounds limed goat skin trimmings for ½ hour at about 32° C. Transfer the trimmings to a revolving drum to which is added 600 pounds water and 10 pounds ammonium sulphate, $(NH_4)_2SO_4$, the latter as a neutralizer for the lime. Rotate the drum about one and one-half hours, maintaining the temperature at about 32° C. After washing with clean water for ½ hour, place the trimmings in a clean vessel with 100 pounds water at about 30° C., to which has been added 8.25 ounces crystalline disodium phosphate $(Na_2HPO_4.12H_2O)$; 0.56 ounce potassium polydiphosphate $(KH_2PO_4)$; and 0.56 ounce crystalline magnesium sulphate $(MgSO_4.7H_2O)$.

Inoculate the proteinous nutrient medium thus prepared with a pure culture of *Clostridium sporogenes* and keep for 60 hours at a temperature of about 37° C., oxygen being excluded.

At the end of the first 36 hours evolution of gas should be evident and at the end of 60 hours the skin trimmings should have disappeared as such.

If standardization is desired, prepare a dried powder from hide trimmings as above described and test the collagen-dissolving power. Concentrate or dilute, as may be indicated, to conform to the desired standard.

With a liquor prepared as here described, applicants found that 10 cc. of the liquor contained proteinase able to digest, under sterile conditions, 50% of 1.4 grams of the powder.

*Example 2*

Prepare a sterile medium by adding to 100 pounds water, 5 pounds Liebig's meat extract; 5.8 ounces $Na_2HPO_4.12H_2O$; 0.2 ounce $KH_2PO_4$; 0.2 ounce $MgSO_4.7H_2O$; and 4 pounds N.NaOH. Inoculate this medium with a spore-forming anaerobe isolated from an infusion of dog dung and keep at about 37° C. for 84 hours under an atmosphere of hydrogen.

*Example 3*

Wash 200 pounds limed goat skin trimmings for ½ hour at about 30° C. in a revolving drum. Transfer to another drum containing 600 pounds water, to which has been added 10 pounds ammonium sulphate. Delime for 1½ hours, wash with clean water for ½ hour.

Transfer trimmings to a culture vessel containing a pure culture of a spore-forming anaerobe isolated from dog dung. Keep for 72 hours, oxygen being excluded. After the first 24 hours evolution of gas should be evident and after 72 hours the trimmings should be dissolved.

Separate 275 pounds of the liquor and add 4½ ounces of the antiseptic mixture disclosed in U. S. Patent 2,041,732.

Upon a test on dried powder, prepared as previously described, it was found that 7 cc. of a liquor prepared as here described digested, under sterile conditions, 41% of 1.4 grams of the powder in 3 hours at 37° C.

Standardize, as desired, as above described.

Example 4

Prepare 1000 pounds of liquor as per Example 3 and mix with 700 pounds bran. Dry the resulting wet mash at 100-110° F. Grind and mix the dried bran containing the metabolic and enzymatic products generated by the spore-forming anaerobic bacteria.

Applicants, after preparing such a dry bate, tested it as above described and found that 1.5 grams of the bate digested, in 17 hours at 37° C. and under sterile conditions, 43% of 1.4 grams of the dried powder. For standardization, the bate was then cut down with bran so that 1.75 grams of the bate performed the same digestion under the same conditions.

Example 5

Wash 2000 pounds, fleshed weight, limed and dehaired goat skins for ½ hour at 27° C.

Put skins in a paddle containing 6000 pounds water at 29° C. Neutralize lime by injecting carbon dioxide gas or by adding ammonium salts or other neutralizer.

Add 40 pounds of the dry bate material described in Example 4. Then add 7 pounds of the disinfectant disclosed in U. S. Patent 2,041,732. Paddle for a short time and leave over night.

Skins so treated have been found to be well bated and, following normal washing, pickling and tanning operations, result in leather of excellent quality.

Example 6

Wash 2140 pounds, fleshed weight, limed and dehaired goat skins for ½ hour at about 27° C.

Put skins in a paddle containing 6000 pounds water at about 33° C. Neutralize lime by injecting carbon dioxide gas or by adding ammonium salts or other neutralizer.

Add 43 pounds of a standardized clear filtrate of a liquor produced by anaerobic spore-forming bacteria as previously described. Add 5 pounds of a standardized proteolytic enzyme such as is customarily used for bating purposes. Add 7 pounds of the disinfectant disclosed in U. S. Patent 2,041,732. Leave over night.

Skins so treated have been found to be well bated and, following normal washing, pickling and tanning operations, result in leather of excellent quality.

What is claimed is:

1. The method of bating skins and hides which comprises inoculating a proteinous nutrient medium with a pure culture of *Clostridium sporogenes*, adding the metabolic products so produced to an aqueous bath, and subjecting the skins or hides to the action of such bath.

2. The method of preparing a bating material which comprises inoculating a suitable proteinous medium with a pure culture of *Clostridium sporogenes*, said medium containing growth-fostering constituents, maintaining the inoculated medium at a temperature of about 32° C., substantially excluding oxygen during the period of bacterial development, adding, at a suitable stage, a disinfectant for preventing further bacterial growth, measuring the collagen-dissolving power of the proteinase in the liquors so produced on a suitable subtrate and adjusting such collagen-dissolving power to a desired standard.

3. The method of bating skins and hides which comprises subjecting the skins or hides to the action of an aqueous bath to which has been added a bating material formed from metabolic products of a pure culture of *Clostridium sporogenes*.

JULIUS PFANNMULLER.
ARTHUR L. SCHADE.
HANS SCHLEICH.